United States Patent [19]
Burke et al.

[11] Patent Number: 5,493,615
[45] Date of Patent: Feb. 20, 1996

[54] PIEZOELECTRIC DRIVEN FLOW MODULATOR

[75] Inventors: Michael J. Burke, Annapolis; George W. Tye, Sykesville, both of Md.

[73] Assignee: Noise Cancellation Technologies, Linthicum, Md.

[21] Appl. No.: 67,277

[22] Filed: May 26, 1993

[51] Int. Cl.⁶ .................................................. G10K 11/16
[52] U.S. Cl. ........................ 381/71; 381/165; 381/190; 310/328; 310/330; 310/331
[58] Field of Search ................................... 310/330, 331, 310/328; 137/130; 381/165, 190, 71; 367/140

[56] References Cited

U.S. PATENT DOCUMENTS

| | | | |
|---|---|---|---|
| 3,050,034 | 8/1962 | Benton | 310/328 |
| 3,456,669 | 7/1969 | Lloyd | 137/84 |
| 4,545,561 | 10/1985 | Brown | 310/330 |
| 4,593,658 | 6/1986 | Moloney | 310/328 |
| 4,787,071 | 11/1988 | Kreuter et al. | 367/140 |
| 4,812,698 | 3/1989 | Chida et al. | 310/331 |
| 5,040,560 | 8/1991 | Glezer et al. | 137/13 |
| 5,207,737 | 5/1993 | Hanley et al. | 137/85 |

*Primary Examiner*—Forester W. Isen
*Attorney, Agent, or Firm*—James W. Hiney

[57] ABSTRACT

An elliptically shaped flow modulator in a duct with a circular cross section is used to produce a time varying head loss in a steady fluid flow in the duct, which results in an unsteady volume velocity at the end of the duct which radiates an acoustic field; the flow modulator can be used in place of a conventional acoustic source in an active noise control system.

4 Claims, 5 Drawing Sheets

PIEZOELECTRIC DRIVEN FLOW MODULATOR

This invention relates to a new type of flow modulator. Flow modulators are devices that produce a time varying head loss in a steady fluid flow in a duct. The head loss variation produces an unsteady volume velocity at the end of the duct. The unsteady volume velocity radiates an acoustic field. Such a flow modulator can be used in place of a more conventional acoustic source in an active noise control system. Flow modulators can also be used in cases in which an unsteady flow coexists with the steady flow. The flow modulator can then use the energy of the steady flow to produce a signal which cancels the unsteady flow.

BACKGROUND

Effort has been expended in the past on reducing the noise emitted from a duct or, e.g., at the end of a muffler pipe, by the provision of a flow modulator therein. This has been studied in an effort to find an alternative solution to "actively" creating anti-noise. The flow modulator can actively control the process leading to strong low frequency emission at the exhaust of pulsed flows.

The type of flows found in the exhaust systems of internal combustion engines or compressors we are interested in usually have an average flow velocity ranging from 20 to 60 m/s. The fundamental frequencies are very low (below 100 Hz). Due to the quasi-incompressibility of the fluid at this low Mach number, the pressure fluctuations are almost in phase everywhere in straight ducts and, strictly speaking, do not "acoustically" propagate. The exhaust mouth of incompressible pulsed flows can be identified with an acoustic monopole (of diameter $r_0$). At a distance R from this source, the acoustic pressure (P(R,t)) is proportional to the variation in time in the mass flow ($Q_m(t-R/c)$):

$$P(R,t) = \frac{1}{4\pi R} \frac{\partial Q_m(t - R/c)}{\partial t}$$

The acoustic energy radiated by a pulsed flow is related mainly to the pulsatory character of the flow. This causal mechanism between Fluid Mechanics and Acoustics shows that reducing the flow modulation amplitude should attenuate the low frequency sound level. However, the existence of walls and the turbulence of the flow constitute "dipolar" and "quadripolar" acoustic sources. Because of their poor efficiency, they will produce a background large band noise, below which the discrete spectrum lines linked to the pulsation cannot be attenuated.

The regulation of a flow is usually provided by a device which modifies the "head loss" (e.g., a valve). When the flow fluctuates periodically around a fixed mean value, the solution is to provide a unit which controls that modulation in real time.

Such a system has been disclosed by L. Hardouin, J. Tartarin and J. Laumonier in DSC Vol. 38, Active Control of Noise and Vibration, ASME, 1992 and in Laboratoire d'Etudes Aerodynamiques (Unit´´de Recherches Associée au C.N.R.S., No. 191, Poitiers, France) and VPI conference on Active Noise Control, 1991, pp 150–162. This system is diagrammed in FIG. 1. The flow modulator device is a circular duct containing a circular disk which can rotate about a shaft. The shaft is driven by a stepper motor. Because the motor will be rotating the flap at a high frequency, on the order of 100 cycles/second, the shaft bearing assembly must be designed with very tight tolerances. It must be free to rotate but it must not be prone to rattling or any kind of non-rotational motion. The inertia of the flap and the high cyclic rate require a powerful stepper motor. This point is mentioned by Tartarin while commenting on one of his early efforts that did not work.

Additional work using devices of this kind is described in *Automotive Engineering* for February 1993, pp 13–16. It is shown in this paper that active attenuation of pressure pulsations in engine exhaust flow can achieve significant sound pressure reductions. Motor-driven oscillating and rotating valves are used. However, the rotating valve (that which makes one complete revolution per noise cycle) is restricted to operating at one frequency only. In automotive applications, the issues of size, weight, and cost are especially significant concerns.

The instant invention is an improvement over the background art inasmuch as it provides a unique modulator arrangement which eliminates the use of having to physically move the modulator by a stepping motor or the like. It uses piezo actuators on the modulator plate to move it.

The advantages of the piezo flow modulator are:

Low complexity. There are essentially no moving parts. Only a power amplifier is required to execute the controller's command. This is in contrast to a stepper motor, motor controller, and bearing assembly as required by Tartarin.

Low cost. Accountings version of the item above.

Low power consumption. The power consumed will be mainly due to heating the amplifier and should be lower than motor based designs.

Accordingly, it is an object of this invention to provide an improved flow modulator for reducing duct noise.

It is another object of this invention to provide a flow modulator operated by electrically stimulating piezo actuators.

These and other objects of the invention will become apparent when reference is made to the accompanying drawings in which FIG. 1 shows a diagrammatic view of a background system utilized by J. Tartarin et al, FIG. 2 shows a duct arrangement used by J. Tartarin et al, FIG. 3 shows a diagrammatic view of a background art modulator flap valve, FIG. 4 shows a view of a piezo controller valve, also called a piezo bender, FIG. 5 is a view of a modulator valve having multiple piezos thereon, FIG. 6 is a view of an alternative valve arrangement, FIG. 7 shows an end view of the arrangement of FIG. 6, FIG. 8 shows an arrangement of multiple piezo bender elements each of which is capable of producing an unsteady head loss. The piezo elements are individually tuned to provide high response at particular frequencies, for example, a fundamental and its first harmonic, and FIG. 9 shows two arrangements in which the piezos are attached to structures in such a way that the structure amplifies the effect of the piezo motion.

DESCRIPTION

An example of a flow modulator is diagrammed in FIG. 3. The device is a valve. It is a circular disk in a circular duct. The angle of the disk relative to the axis of the duct can be controlled and varied at high speed. Changing the angle changes the head loss through the valve. One difficulty is that the relationship between the head loss and the angle of incidence is non-linear. Another is that the mean angle of the valve must also be determined. A further difficulty is that the torque that the flow exerts on the flap must be reacted. The overwhelming difficulty is that an external actuator is required to rotate the valve, and the valve and its support must be designed to accommodate such motion. The inertia of the system makes high frequency, high amplitude motions unlikely.

The valve 10 is pivoted at 11 and adapted to be constantly moved by an external actuator (not shown) within duct 12 between positions A and B. The upstream duct has uniform airflow as at 13 and perturbed airflow as at 14 due to the modulator valve 10. Alternatively, the upstream flow at 13 has uniform and perturbed components and the flow at 14 is uniform due to the modulator valve 10.

Figure 4:
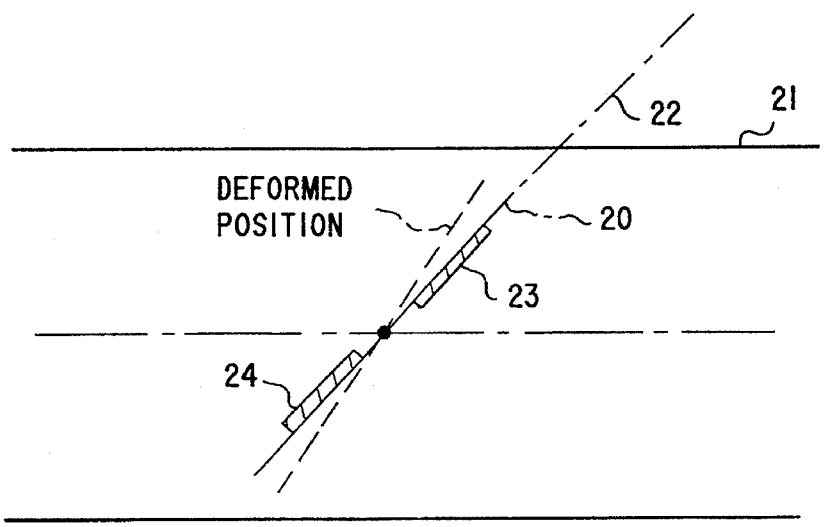

The piezo flow modulator, diagrammed in FIG. 4, is very similar to the conventional one. It is a circular disk 20 in a circular duct 21. Unlike the conventional device, the mean angle 22 is fixed. The shaft that the disk is attached to does not rotate but is fixed. Instead, the head loss is changed by deforming the disk. This deformation is accomplished by applying a voltage to the piezoelectric patches 23, 24 bonded to the disk.

A potentially useful variation is to have an elliptical valve. This shape acknowledges that the "best" mean angle for the valve will be one that leaves the duct fairly well blocked. The advantage of the elliptical shape is that, with all else constant, the increased length will make the valve easier to deform, and it will provide more options for placing the piezo on the valve. It is also possible that the length and other parameters can be chosen so as to produce a resonant, high amplitude response near the disturbance frequency.

Figure 1:
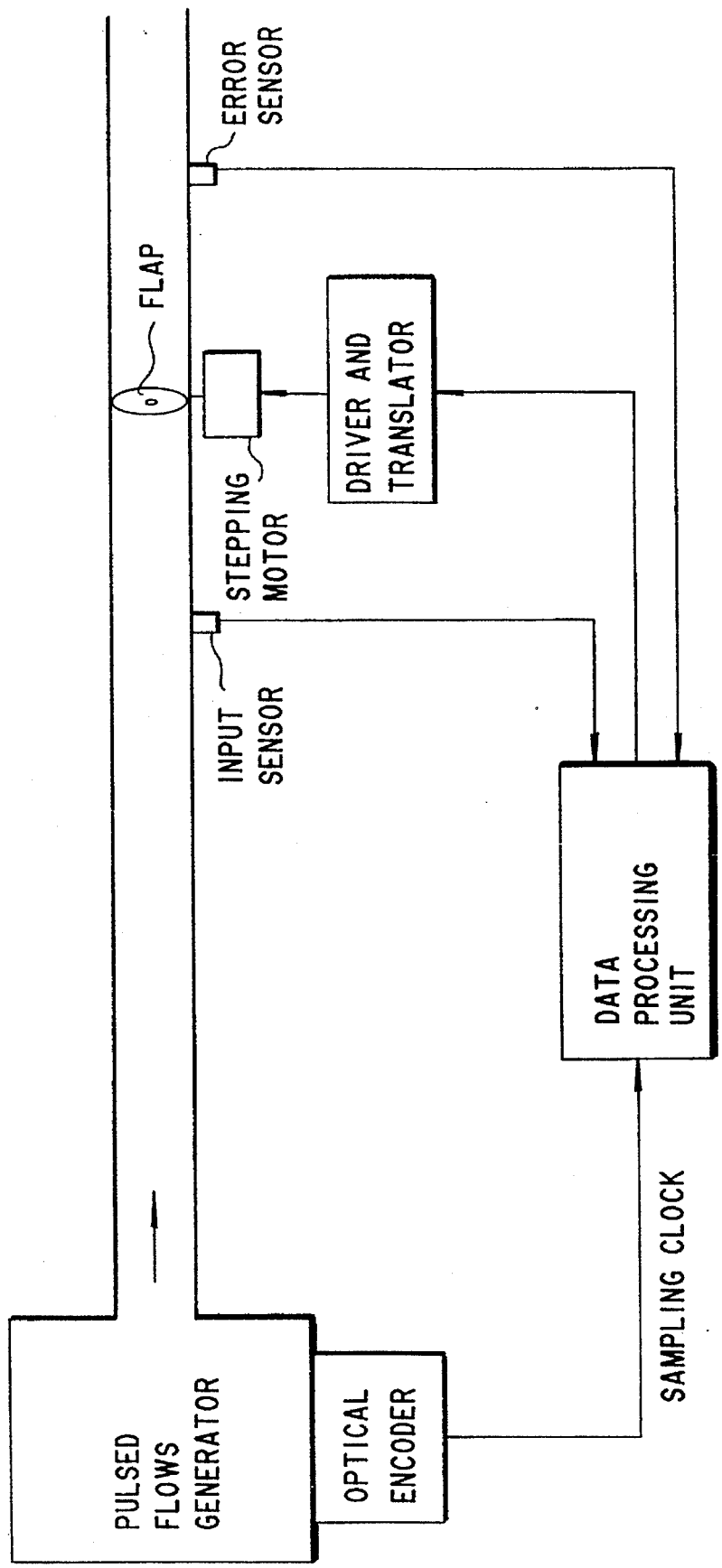
FIG. 1 shows a system for controlling pulsed flows using a stepping motor to move a flap in accordance with signals from the DPU which has as inputs feeds from an input sensor and an error sensor. An optical encoder is also used.
Figure 5:
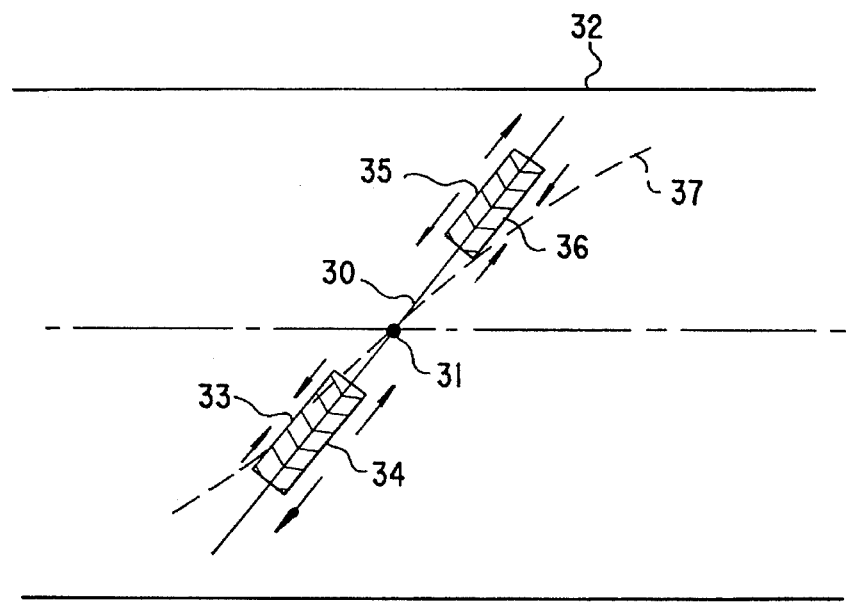
Figure 2:
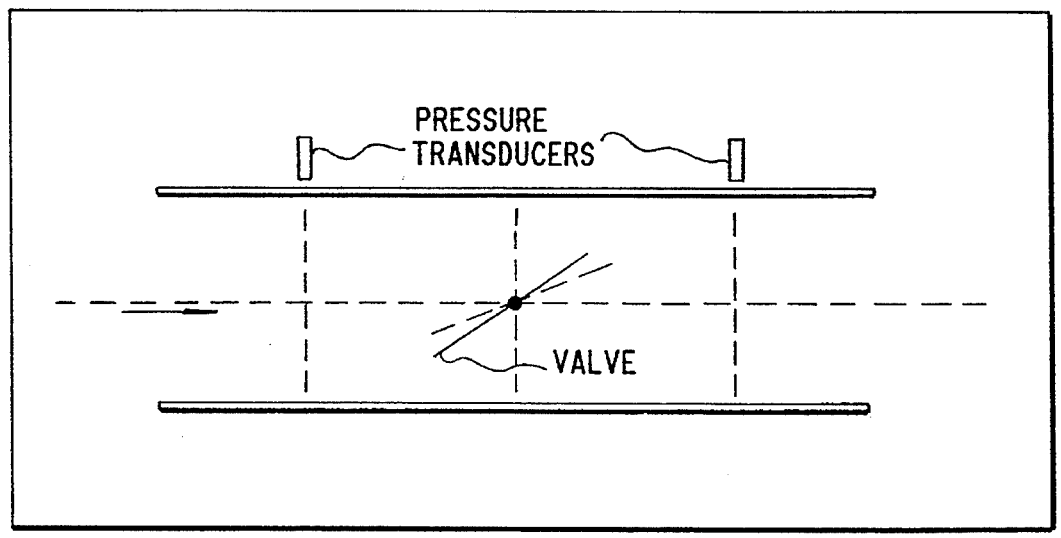
FIG. 2 shows a close up of an area of a background art set up with pressure transducers sensing the differences in pressure and, through a DPU, causes the valve to move accordingly.
Figure 3:
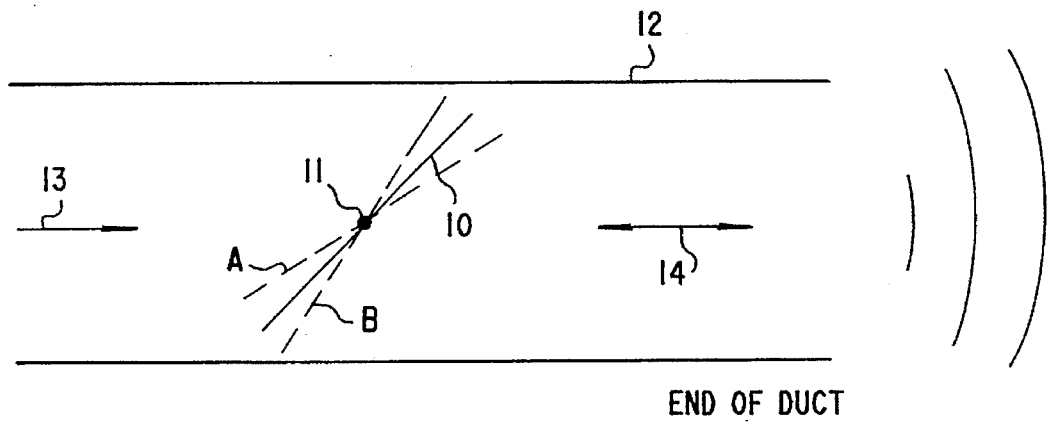

FIG. 5 shows a variation of the valve with modular flap 30 being rigidly fixed to a rod 31 also rigidly mounted in duct 32. Piezo plates 33, 34, 35 and 36 are bonded to flap 30. When plates 33 and 36 are activated one way with a voltage and plates 34 and 35 are activated in an opposite direction (as shown by the arrows) the flap deforms as shown by the dotted line 37. The double piezos can effect more distortion thus a wider range of flow volumes is achieved.

Figure 6:
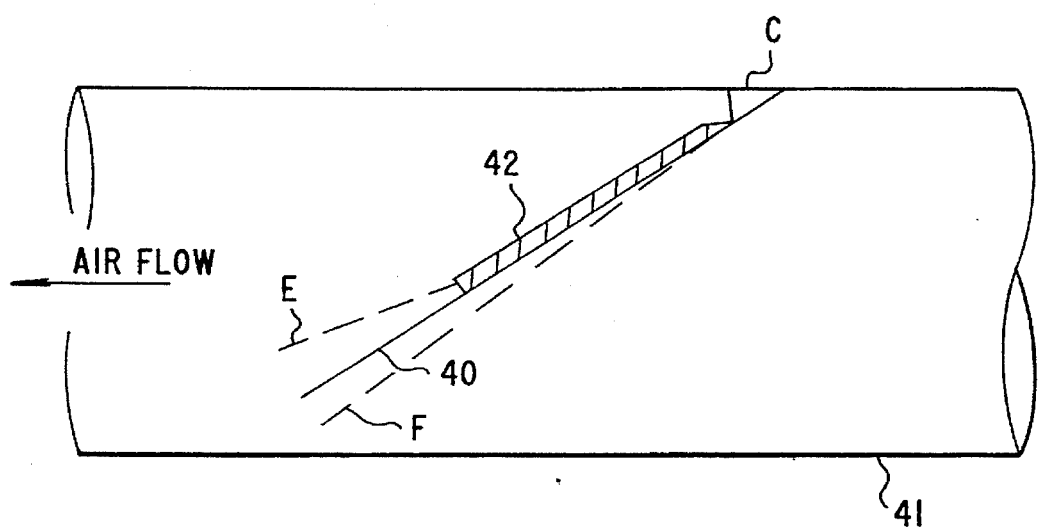
Figure 7:
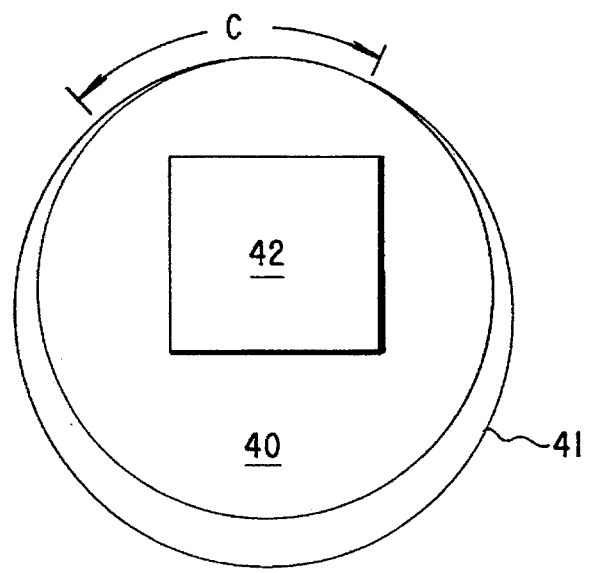

FIGS. 6 and 7 show an alternative to the invention with a flap 40 mounted in duct 41 and rigidly affixed thereto along "C". A piezo actuator 42 adapted to deform when voltage is applied to it is bonded to flap 40 and deforms it to either position E or F depending on the polarity of the applied voltage.

Figure 8:
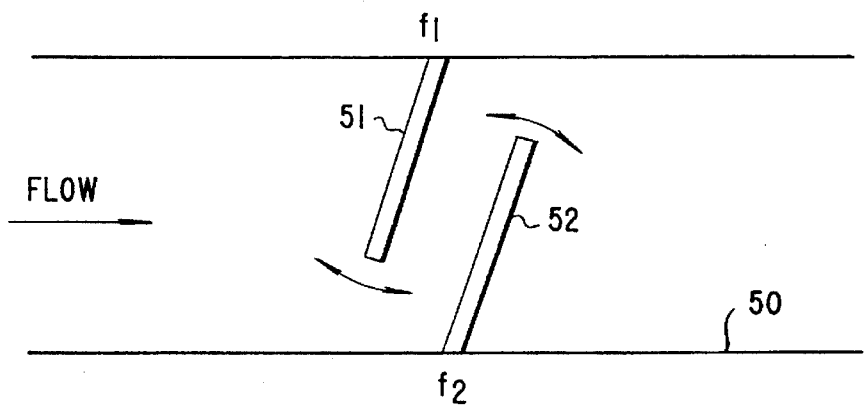

FIG. 8 shows a useful combination of the preceding ideas. Multiple flaps 51, 52 are fixed to the duct 50 walls as was illustrated in FIGS. 6 and 7. The movement (deformation) of either flap will achieve the desired change in head loss. Each of the flaps is tuned to produce a large response at a particular frequency, such as $f_1$ or $f_2$ as described in the discussion of FIG. 4. The multiple flap management of FIG. 8 allows for the generation of anti-noise in cases in which high amplitude is required and multiple harmonics exist.

Figure 9:
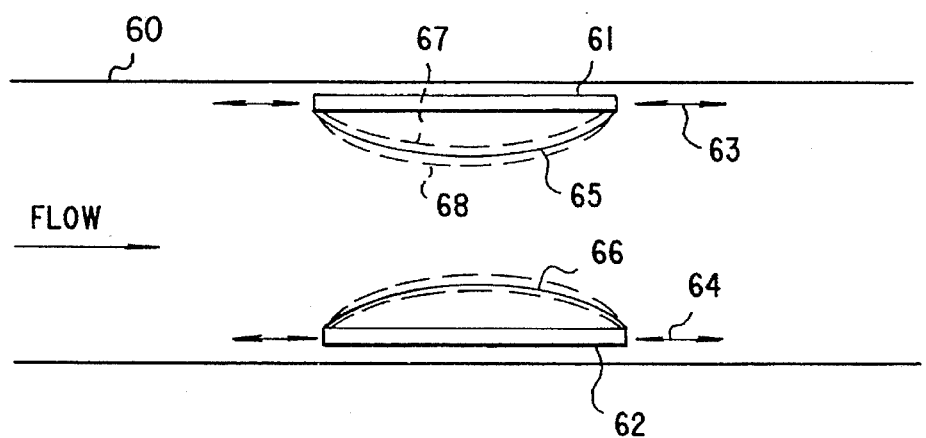

FIG. 9 shows the arrangements in which piezos 61, 62 are attached to structures such as duct 60, in a manner that is different from those described previously. As the piezo element lengthens and shortens as at 63, 64 the arched structure 65, 66 that it is attached to bows in, as at 67 and out, as at 68. It is understood from elementary mechanics that the displacement at the midspan of the arch will be much greater than the displacement of piezo elements 61, 62. The structural configuration is used to amplify the piezo motion enabling a greater head loss variation to be achieved.

Having described the invention, it will be obvious to those of ordinary skill in the art that many changes and modifications can be made without departing from the scope of the appended claims in which

We claim:

1. An active anti-pulsatory system for controlling low frequency noise from a duct, said system comprising an elongated duct means circular in cross-section, a modulator valve means rigidly affixed at a predetermined angle inside said duct means so as to allow airflow thereby, said modulator means being elliptically shaped, actuator means affixed to said modulator valve means and adapted upon electrical stimulation to change the flow characteristics of said duct means by causing said valve means to deform.

2. A system as in claim 1 wherein said modular valve means is generally planar and is rigidly affixed to said duct means at midway across its planar area.

3. A system as in claim 1 wherein said actuator means comprises piezo element means affixed to said elliptical modulator valve means so as to cause deformation thereof when they are electrically stimulated.

4. A system as in claim 1 wherein one edge of said elliptical modulator valve means is affixed to the inside of said duct means.

* * * * *